United States Patent [19]
Husain et al.

[11] Patent Number: 6,027,026
[45] Date of Patent: Feb. 22, 2000

[54] DIGITAL AUDIO RECORDING WITH COORDINATED HANDWRITTEN NOTES

[76] Inventors: Abbas M. Husain, 8 Bunning Dr., Voorhees, N.J. 08043; Arch Luther, P. O. Box 1426, Merchantville, N.J. 08109

[21] Appl. No.: 08/933,071

[22] Filed: Sep. 18, 1997

[51] Int. Cl.$^7$ ..................................................... G06K 5/00
[52] U.S. Cl. .......................... 235/487; 235/436; 235/454; 369/32; 360/2
[58] Field of Search ..................................... 235/487, 462, 235/472, 436, 432, 462.01, 472.01, 454; 369/32, 48; 360/2

[56] References Cited

U.S. PATENT DOCUMENTS

| | | | |
|---|---|---|---|
| 4,621,259 | 11/1986 | Schepers et al. | 340/707 |
| 4,652,733 | 3/1987 | Eng et al. | 235/462 |
| 4,831,610 | 5/1989 | Hoda et al. | 235/472 |
| 5,126,543 | 6/1992 | Bergeron et al. | 235/462 |

*Primary Examiner*—Donald Hajec
*Assistant Examiner*—Daniel St. Cyr
*Attorney, Agent, or Firm*—Robert D. Thompson

[57] ABSTRACT

The present invention is an apparatus to facilitate the correlation and retrieval of notes of a meeting or transaction taken on paper by conventional handwriting or typing with the sound recording of the same transaction or meeting. The device comprises multiple pick-up and control units which transmit sound and a unique bar code identifier through a control device to a computer where the sound transmission is recorded and stored. A removable medium recorder is also provided to provide storage in the event that the storage capabilities of the computer are exceeded. The computer will not accept data for recording until the unique identifying bar code or other identification device is detected. After recording, the data is maintained in the memory of the computer or some other electronically accessible medium. Thereafter when it is necessary to correlate the notes of the meeting or transaction with the recording of that same meeting or transaction, the unique bar code which was imprinted on the paper on which the notes of the meeting or transaction were recorded is used to locate and retrieve from the computer the recording of the meeting or transaction.

9 Claims, 5 Drawing Sheets

DIGITAL AUDIO RECORDING WITH COORDINATED HANDWRITTEN NOTES

BACKGROUND OF INVENTION

Although sound recording provides a complete record of the proceedings of a meeting or interview, it is often valuable to also create a written summary during the meeting or interview which will provide a concise report of the activity conducted which can be reviewed more quickly than listening to the complete recording. This is accomplished in many cases by the taking of written notes during the session. When this is done however it is often helpful if not completely necessary to coordinate the storage of written notes from numerous meetings or sessions with the corresponding sound recordings of those meetings or sessions. The present invention provides a means for simultaneously creating written summary notes on paper and full sound recordings of proceedings conducted during a meeting or interview so that at a later time, both the notes and the sound recording may be quickly and efficiently retrieved.

Sound recording of meetings or interviews is very commonly done using a medium such as audio magnetic tape. The recorded tapes are usually identified by labeling them and thereafter storing the tapes in boxes or racks. If written notes are taken during a recorded session, those notes are normally identified by some kind of written identification and the notes are usually stored in file cabinets. When it becomes necessary to review the content of a meeting, the notes from the meeting are retrieved from the file cabinet. If it is also necessary to review the sound recording of the meeting, the corresponding tape must be found in the tape storage area by reading the tape labels and coordinating the tape labels manually with the written identification from the notes. This use of different storage and search methods for the two media involved (paper and magnetic tape) is awkward, time-consuming and very susceptible to error.

The storage of sound recordings is greatly facilitated when recordings are made digitally on a computer disk. A single disk in the computer can potentially store many hours of recording and individual recordings can be quickly retrieved and played by using the computer's file system. By use of removable high-capacity disk media such as CD-ROM, magneto-optical disk or magnetic disk, the sound storage capacity can be virtually limitless.

The handwriting of summary notes on paper during a meeting is an accepted time proven method to create a record of the meeting. The notes can be taken by any participant and the note taking can be accomplished without distracting the participants in the meeting. Written notes can be stored by way of conventional filing and can be retrieved and read without any special equipment or skills. However, absent the use of a special stenographer who can take a verbatim transcript of the meeting, generally the written notes are a summary of the proceedings conducted at the meeting rather than a complete transcript of everything that was said in the meeting. In many instances, such as the recording of proceedings during a physician's examination, the use of a special person for transcribing is neither acceptable nor affordable and the notes of the proceeding, i.e. the physical examination, are normally recorded by the physician in summary form. In such a situation, the concurrent use of sound recording provides and inexpensive non-obtrusive method of capturing an accurate transcript of the proceedings. However, in order to fully utilize the office summary notes with the sound recording of the proceedings during the examination, an efficient and inexpensive method of coordinating the storage and retrieval of the two methods of recording the proceedings is essential. This is especially true where the sound recording medium may contain recordings of numerous meetings, or in the case of a physician, examinations. While it is normal practice, in the case of a physician, to maintain the handwritten notes of the examination in the patient's file, it is not practical to segregate the recording of one particular examination and store that in the patient's file.

Although the problem of coordinating written notes with a computer storage sound recording could be easily accomplished if the notes were also maintained on the computer, this requires that either the notes be taken on the computer or scanned into the computer. This would require the availability of special equipment or the use of a separate operation, i.e., scanning with its attendant additional costs. Keeping the notes on a computer also requires a person with computer skills and restricts the flexibility of the operation. Several prior art systems have taken this approach and describe elaborate means for the note-taker to use during the meeting. Their objective is to "simplify" note taking but they require the note-taker to learn complex protocols and to use a special tool for capturing the notes. Moreover, computerized note taking requires the availability of a computer whenever notes are retrieved and read. Writing or reading notes recorded on paper requires no computer and can be done by one without any computer skills. Although the use of the computer is becoming more and more common in business, written notes will always be used thereby raising the need for a method to handle those written notes in coordination with computerized records.

The objectives of this invention are:
1. To provide means for coordinating handwritten notes and computerized sound recordings that are created simultaneously but later stored separately;
2. To prevent errors in the creation, storage and retrieval of written notes and corresponding sound recordings;
3. To provide coordination of paper and computerized records at low cost and without requiring any special skills on the part of the user.

SUMMARY OF THE INVENTION

The present invention provides printed identification codes that are placed on paper notes and used in such a way that a matching code will be embedded in any computerized recording that is made simultaneously while the note papers is being used. For retrieval, the paper is retrieved first from conventional files and the conventional file's printed code is read in order to retrieve the corresponding computer recording.

BRIEF DESCRIPTION OF SEVERAL VIEWS OF THE DRAWINGS

A more complete understanding of the invention and its advantages will be apparent from the detailed description taken in conjunction with the accompanying drawings in which.

DETAILED DESCRIPTION OF THE INVENTION

Figure 1:
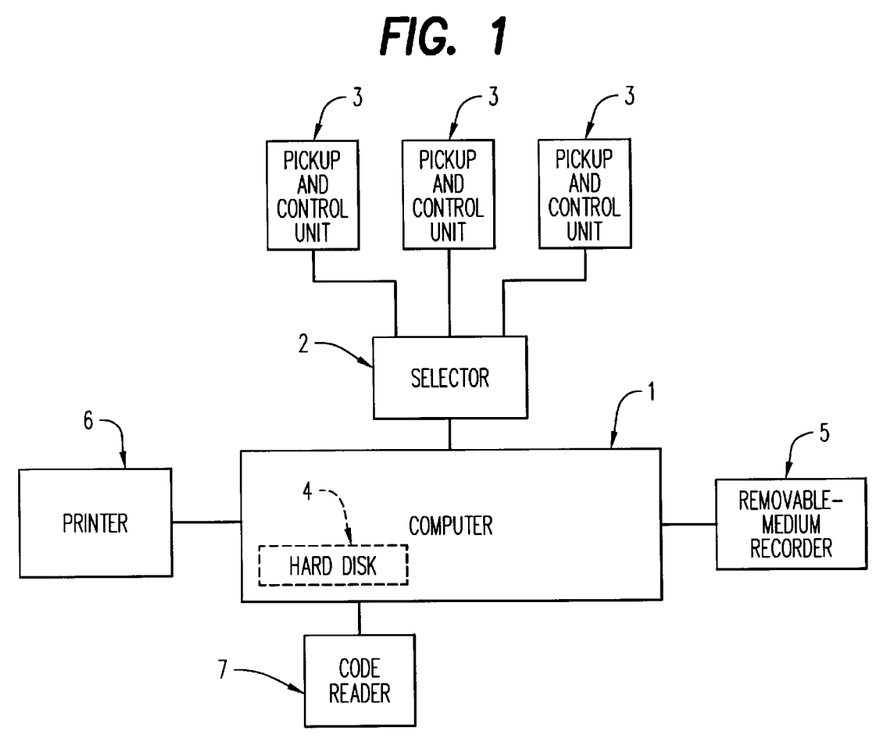
FIG. 1 is a block diagram of a record keeping system showing one embodiment of the invention.

Referring to FIG. 1, which shows one embodiment of the invention designed for use in a physician's office for note taking and sound recording of medical examinations, the apparatus includes a computer 1, a selector 2, pick-up and control units 3, a code reader 7, a removable medium recorder 5 and a printer 6. The computer 1 performs digital recording and storage of sound and all system control processing. The computer may be a conventional desktop personal computer or any equivalent unit. The selector 2 is a computer controlled switch that allows the computer to select one of a multiplicity of pick-up and control units 3 for current use. The multiple units may be located in different examining rooms or the doctor's office. The computer contains internal disk storage 4 for holding digital sound recordings, a standard analog-input sound digitizer and standard software for recording from the sound digitizer to hard disk. The computer also has a separate removable medium recorder 5 for creating removable-medium recordings which would be required when the internal hard disk becomes full. A printer 6 allows identification markings to be printed on adhesive labels or note papers. A code reader unit 7 provides for reading of code markings from note papers for retrieval of the corresponding sound recording. An appropriate coding method for this application is bar codes.

Figure 2:
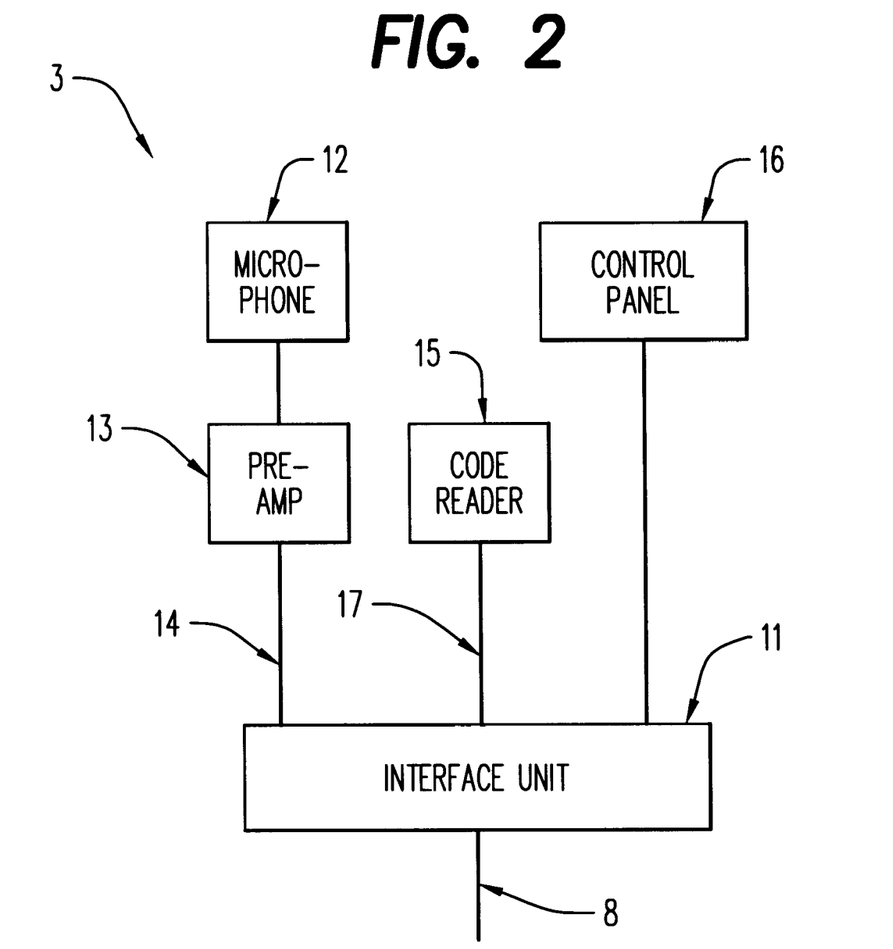
FIG. 2 is a block diagram of the pick-up and control unit of FIG. 1.

The pick-up and control unit 3 is further detailed in FIG. 2. An interface unit 11 connects all other components to the interface cable 8 that goes to the selector 2. The cable 8 is a combined analog-digital connection although it will be evident to one skilled in the art that it could be made all digital by including an analog-to-digital converter unit in the pick-up and control unit. A microphone 12 is provided for the pick-up of sound. The output of the microphone 12 is amplified by pre-amp 13 for delivery via analog cable 14 to interface unit 11. A code reader device 15 is also connected to interface unit 11 via flexible cables 17. This reader is of a type suitable for scanning the codes that are placed on the note paper and delivering a digital representation of the code to the rest of the system. The control panel 16 is connected to the interface unit 11.

It will be apparent to one skilled in the art that an alternative and equivalent architecture could make the interface cable 8 a telephone connection and that selector 2 and computer 1 could be at another location on the telephone network and could serve many more than three users.

Figure 3:
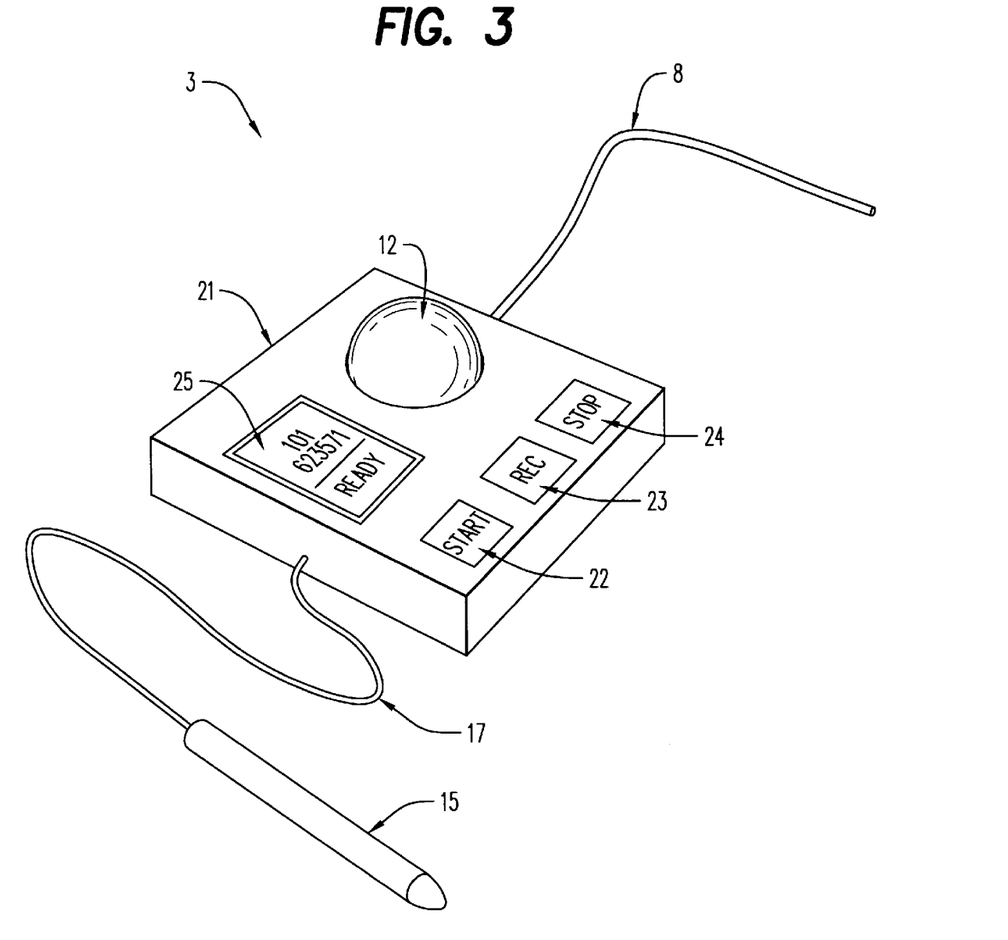
FIG. 3 is a drawing of one possible physical design for the pick-up and control unit.

FIG. 3 shows one possible implementation of a pick-up and control unit 3 and provides more detail of the control panel 16. A housing 21 contains the components of the pick-up and control unit 3 which is designed to be placed on a flat surface in the examining room where the microphone 12 on top of the housing 21 will pick up the voices of the physician and the patient in the room. A wand-type code reader 15 is connected to the housing by way of a flexible cable 17 that will allow convenient operation of the reader 15. The elements of the control panel 16 are placed on the surface of the housing 21 where they may be readily operated by the physician. The control panel 16 comprises three control buttons 22, 23 and 24 and a LCD display 25. Because the sound of operation of the control buttons may be sensed by the microphone, it will be desirable to provide an isolating mount (not shown) for the microphone to minimize acoustic interference.

Figure 5:
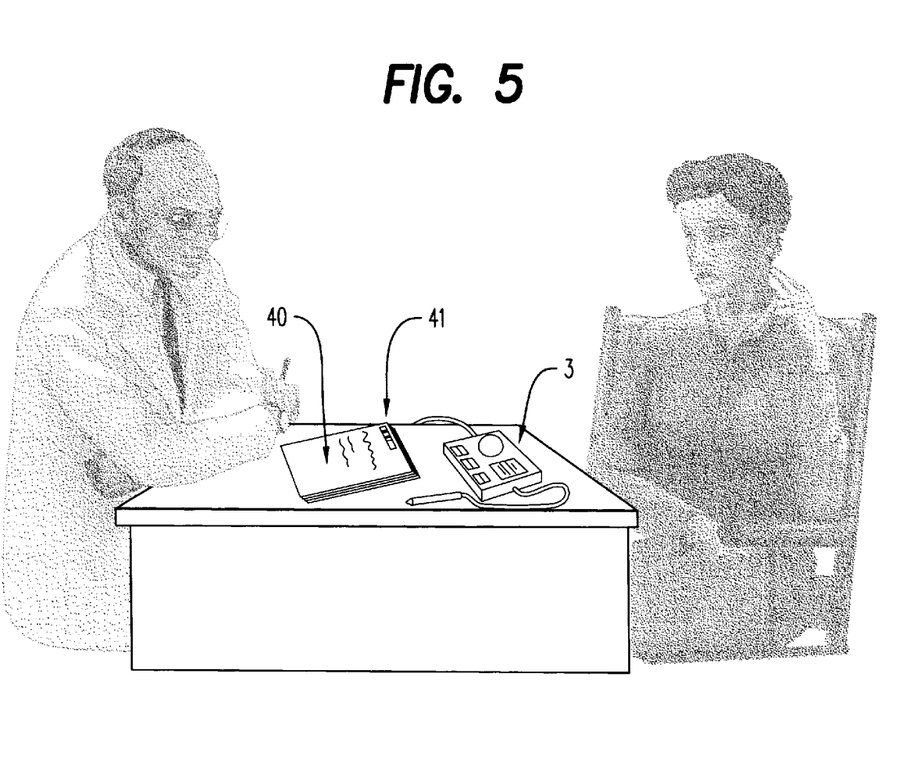
FIG. 5 is a drawing of the unit of FIG. 3 in use by a physician.

In operation as shown by FIG. 5, it is necessary for the note paper 40, used by the physician for taking handwritten notes, to be bar coded before use. The exact content of the bar code 41 is not important as long as each one is unique. That can be accomplished by making the bar codes on site using the computer printer 6 and assigning the bar code sequential numbers. Bar codes can be printed directly onto notepaper or they may be printed on adhesive labels to be attached to the notepapers for use. The physician must always have a bar coded notepaper in hand before it will be possible to begin recording sound. A key feature of this invention is that sound recordings cannot be made without first entering a bar code.

When removable storage media are to be used with the removable medium recorder 5, the system must provide means to identify a particular removable medium piece so that, upon a request for retrieval of a specific recording, the appropriate piece of medium can be inserted into unit 5 for playback. This is best accomplished by having the identification of the current removable medium piece that is being prepared included in the bar code. In the example of FIG. 3 that shows the contents of the display 25 immediately after scanning the bar code, this is shown by the numerical display that identifies the medium as number 101 and the other number, 623571, is the current sequential number. This approach poses the management task that, when the hard disk is dumped to medium 101, a new set of bar codes must then be produced for the next piece of medium and the office must make sure that any remaining bar codes from previous media are purged from use.

An alternative approach for management of the medium identification is possible by having the computer maintain a global index of recording numbers and medium numbers. On requests for retrieval, the computer would first look up this index for the medium number of the requested recording. It would then check the medium number that is on-line and, if it is not the correct one, request the user to insert the proper one.

Figure 4:
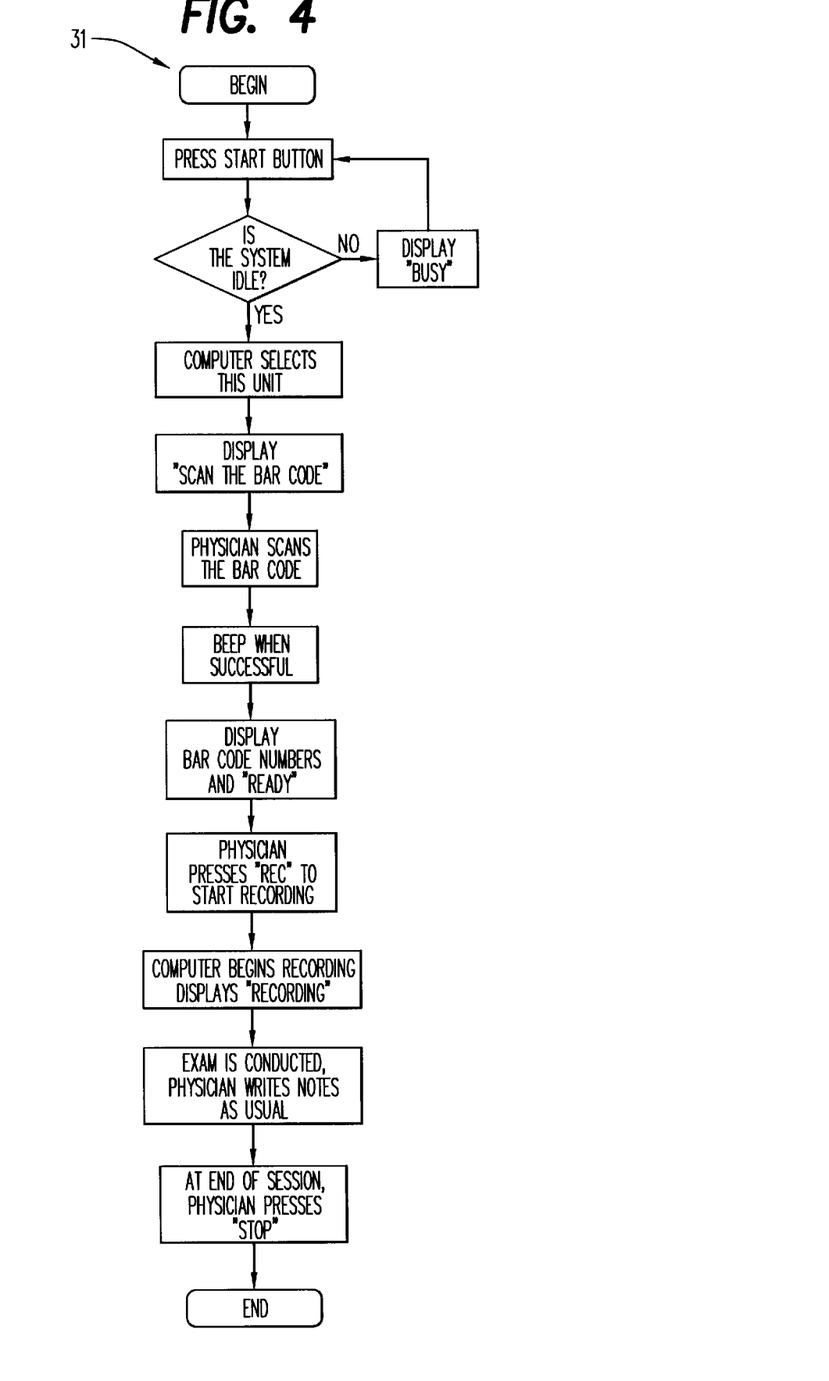
FIG. 4 is a flow chart showing the use of the system in FIG. 1.

The operation of the system may be further understood by reference to the flow chart of FIG. 4. The process of recording a session begins when the physician presses the START button 22 on the pick-up and control unit 3. This is shown in FIG. 4 at location 31. The design of the selector unit 2 is such that START commands from any of the connected pick-up and control units 3 are passed directly to the computer regardless of which pick-up unit is selected. If another pick-up and control unit 3 is selected while inputting is in process from another pick-up and control unit, the computer 1 will simply send back a display command "BUSY". Otherwise, the computer 1 will select the current pick-up and control unit 3 and respond to the unit by displaying "SCAN THE BAR CODE" on its LCD display 25.

When the physician responds with a successful bar code scan from the note paper being used for this examination, there is a beep from the pick-up unit and the computer displays the bar code value along with the word "READY". The computer 1 also prepares for recording using the identification values from the bar code but it does not actually begin recording. The identification values are used to create a unique file name for the sound recording so that the recording can be retrieved later by simply looking up the bar code value in the directory of the recording medium, whether hard disk or removable disk.

To continue the process, the physician can press the REC button 23 at any time to begin recording. During the examination the physician makes notes on the bar coded paper and the recording is captured by the computer 1 onto its hard disk 4. At the end of the session, the physician simply presses the STOP button 24 which will end the recording and de-select that pick-up and control unit 3 making the system available for use from another pick-up and control unit 3.

Retrieval of a recording at a later time is done by retrieving the paper note from the patient's file and, at the computer location, using the bar code reader 7 to scan the code from the paper. The computer first looks up the appropriate removable medium number and prompts the user if it not already on line. With the appropriate medium available, the computer searches the sound directory for the file name indicated by the bar code and allows playback of the recording. The usual recording controls for PLAY, PAUSE, FAST FORWARD, FAST REVERSE and STOP can be provided on the computer screen for this purpose.

It will be evident to those skilled in the art that the system of bar coding could be expanded to include additional patient information other than simply an identification number. Patient data could be extracted from the physician's office computer and other available data such as date and time could be added by the recording computer itself. A header data structure could also be added to the sound recording file to include other information about this particular examination.

Although this invention has been disclosed and illustrated with reference to a particular embodiment for medical examinations, the principles involved are susceptible for use in numerous other situations which will be apparent to persons skilled in the art.

What is claimed is:

1. An electronic recording system comprising, in combination, means for recording and storing a multiplicity of data, said recorded and stored data being addressable for retrieval by means of an identification code which uniquely identifies said recorded and stored data, said identification code being capable of being printed on paper and being read electronically, in which electronic recording system, the reading of said identification code is required to begin recording of the data.

2. An electronic recording system as set forth in claim 1 in which said recorded and sound data is in a form of sound recording.

3. An electronic recording system as set forth in claim 1 wherein said identification code is a bar code.

4. An electronic recording system as set forth in claim 1 wherein said recording data is a sound recording and wherein the paper on which the identification code is printed contains written notes summarizing a content of the sound recording.

5. An electronic recording and storage system comprising, in combination, means for recording data and means for storing data in computer mass memory, said data being addressed for location and playback by way of an identification code, said identification code being comprised of unique numbers and capable of being printed on paper and being read electronically, and said reading of said identification code being required to begin recording and storage of said data.

6. An electronic recording and storage system as set forth in claim 5 wherein said recorded data is a sound recording.

7. An electronic recording and storage system as set forth in claim 5 in which said identification code is a bar code.

8. A system for recording and storage of data with corresponding summary notes written on paper comprising means for identifying and correlating marks on written summary notes with electronically recorded and stored data, means for reading and identifying marks on notes written on paper as an identification code, means under control of said computer to begin recording of sound to said computer's mass storage upon receipt of said identification code, and means for identifying said recording of sound with said identification code on summary notes written on paper.

9. A system for coordinating and correlating sound recordings of meetings or transactions and notes written on paper taken during said meeting or transaction, comprising, in combination, a pick-up and control unit including at least one microphone device for picking up sound in the meeting room and a bar code with reader for reading identifying marks placed on note paper, a sound recording and storage device, said sound recording and storage device having means to identify the sound recorded and stored data with the notes written on paper.

* * * * *

UNITED STATES PATENT AND TRADEMARK OFFICE
CERTIFICATE OF CORRECTION

PATENT NO. : 6,027,026

DATED : February 22, 2000

INVENTOR(S) : Abbas M. Husain, et al.

It is certified that error appears in the above-identified patent and that said Letters Patent is hereby corrected as shown below:

Column 4, line 56, change "note" to --bar-coded--.

Column 4, line 56, after "paper" insert --40--.

Column 4, line 60, after "code" insert --41--.

Column 5, line 2, after "paper" insert --40--.

Signed and Sealed this

Thirteenth Day of June, 2000

*Attest:*

*Attesting Officer*

Q. TODD DICKINSON

*Director of Patents and Trademarks*

(12) EX PARTE REEXAMINATION CERTIFICATE (8192nd)
United States Patent
Husain et al.

(10) Number: US 6,027,026 C1
(45) Certificate Issued: May 3, 2011

(54) DIGITAL AUDIO RECORDING WITH COORDINATED HANDWRITTEN NOTES

(76) Inventors: Abbas M. Husain, Voorhees, NJ (US); Arch Luther, Merchantville, NJ (US)

Reexamination Request:
No. 90/010,915, Apr. 19, 2010

Reexamination Certificate for:
Patent No.: 6,027,026
Issued: Feb. 22, 2000
Appl. No.: 08/933,071
Filed: Sep. 18, 1997

Certificate of Correction issued Jun. 13, 2000.

(51) Int. Cl.
*G06K 5/00* (2006.01)

(52) U.S. Cl. .................. 235/487; 235/436; 235/454; 369/30.3; 360/2

(58) Field of Classification Search .................. None
See application file for complete search history.

(56) References Cited

U.S. PATENT DOCUMENTS

| | | |
|---|---|---|
| 4,841,132 A | 6/1989 | Kajitani et al. |
| 5,155,341 A | 10/1992 | Ohtani et al. |
| 5,265,075 A | 11/1993 | Bergeron et al. |
| 5,592,374 A | 1/1997 | Fellegara et al. |

*Primary Examiner* — Minh T Nguyen (57) ABSTRACT

The present invention is an apparatus to facilitate the correlation and retrieval of notes of a meeting or transaction taken on paper by conventional handwriting or typing with the sound recording of the same transaction or meeting. The device comprises multiple pick-up and control units which transmit sound and a unique bar code identifier through a control device to a computer where the sound transmission is recorded and stored. A removable medium recorder is also provided to provide storage in the event that the storage capabilities of the computer are exceeded. The computer will not accept data for recording until the unique identifying bar code or other identification device is detected. After recording, the data is maintained in the memory of the computer or some other electronically accessible medium. Thereafter when it is necessary to correlate the notes of the meeting or transaction with the recording of that same meeting or transaction, the unique bar code which was imprinted on the paper on which the notes of the meeting or transaction were recorded is used to locate and retrieve from the computer the recording of the meeting or transaction.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2, 4, 6 and 8-9 is confirmed.

Claims 1, 3, 5 and 7 are cancelled.

\* \* \* \* \*